United States Patent
Marsh

(10) Patent No.: US 6,683,770 B1
(45) Date of Patent: Jan. 27, 2004

(54) TRI-MODE OVER-VOLTAGE PROTECTION AND DISCONNECT CIRCUIT APPARATUS AND METHOD

(75) Inventor: Richard N. Marsh, Cool, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 170 days.

(21) Appl. No.: 09/713,360

(22) Filed: Nov. 14, 2000

(51) Int. Cl.$^7$ ................................................ H02H 3/22
(52) U.S. Cl. .................................................... 361/111
(58) Field of Search ............................ 361/34, 54, 56, 361/58, 82, 77, 91.1, 111

(56) References Cited

U.S. PATENT DOCUMENTS

| | | | |
|---|---|---|---|
| 4,901,183 A | 2/1990 | Lee | 361/56 |
| 5,388,021 A | 2/1995 | Stahl | 361/56 |
| 5,412,526 A | 5/1995 | Kapp et al. | 361/56 |
| 5,534,769 A | 7/1996 | Ishii | 323/283 |
| 5,675,468 A | 10/1997 | Chang | 361/119 |
| 5,808,850 A | 9/1998 | Carpenter, Jr. | 361/127 |
| 5,978,198 A | * 11/1999 | Packard et al. | 361/111 |
| 6,038,117 A | 3/2000 | Dullni et al. | 361/58 |
| 6,040,969 A | * 3/2000 | Winch et al. | 307/127 |
| 6,040,971 A | 3/2000 | Martenson et al. | 361/118 |
| 6,055,147 A | 4/2000 | Jeffries et al. | 361/103 |

* cited by examiner

*Primary Examiner*—Gregory J. Toatley, Jr.
*Assistant Examiner*—Boris Benenson
(74) *Attorney, Agent, or Firm*—LaRiviere, Grubman & Payne, LLP

(57) ABSTRACT

A single-phase apparatus and method having a component-efficient circuit configuration for protecting AC power lines from power surges and preventing the hazardous condition occurring at the wall receptacle which arises from accidental reversal of the line wire (L) with the neutral wire (N), from adversely affecting peripheral devices attached to the line. Protection is achieved by removing operating power from a relay having normally-open contacts to simultaneously disconnect both hot and neutral power lines, but not the ground (G), feeding the peripheral device when the over-voltage event occurs in any of three wire pairings: L-N, L-G, or N-G. A lighted indicator warns that the apparatus has absorbed an excessive energy and has opened the circuit.

6 Claims, 1 Drawing Sheet

TRI-MODE OVER-VOLTAGE PROTECTION AND DISCONNECT CIRCUIT APPARATUS AND METHOD

TECHNICAL FIELD

The present invention relates to over-voltage protection circuits. More particularly, the present invention relates to over-voltage protection circuits having metal oxide varistor (MOV) devices as the over-voltage sensing component. Even more particularly, the present invention relates to over-voltage protection circuits having metal oxide varistor (MOV) devices as the over-voltage sensing component for utilization in AC electric power distribution.

BACKGROUND OF THE INVENTION

The current state of the art electronic components (e.g., both commercial and residential computers and related equipment) accommodate transient voltage surge suppression features for protecting their highly sensitive circuits from over-voltage damage. Most transient voltage surge suppression systems today address only minor fault conditions associated with normal use and cannot handle a major over-voltage condition as would occur during loss of neutral, loss of ground, or repetitive current pulses (e.g., from a lightning strike). Typical voltage surge protection devices comprise either a plurality of fault fuses where the input is disconnected from the output. The related art surge suppression systems may involve various metal oxide varistor (MOV) and fuse combinations. MOVs are typically non-linear devices formed from composite ceramic materials (e.g., ZnO grains in combination with an amorphous material). MOVs maintain the voltage within a narrow band (i.e., varistor voltage) over a wide current range. During major over-voltage conditions, the MOVs may absorb heat so excessive such that they will rupture or explode, thereby allowing the related electronic equipment to be destroyed.

Some related art surge suppression apparatus patents include:

(1) U.S. Pat. No. 6,055,147 to Jeffries et al. which teaches a plurality of MOVs being in series with a plurality of thermal fuses;

(2) U.S. Pat. No. 5,412,526 to Kapp et al. which teaches a plurality of MOVs being in series with a plurality of thermal fuses, and the plurality of MOVs being in parallel with a plurality of resistors;

(3) U.S. Pat. No. 6,040,971 to Martenson et al. which teaches a plurality of MOVs being in parallel with one another, an MOV being in parallel with a thermal fuse, and the thermal fuse being in series with a circuit protection device having an over-voltage trip device;

(4) U.S. Pat. No. 5,388,021 to Stahl which teaches a plurality of MOVs being in parallel with a plurality of resistors and a plurality of inductors, and a plurality of MOVs being in parallel with another;

(5) U.S. Pat. No. 5,675,468 to Chang which teaches two input terminals, two fuses in series respectively, a triac, an MOV in series between one fuse and an output terminal, a static potential limiter between the triac and ground;

(6) U.S. Pat. No. 4,901,183 to Lee which teaches two MOVs being in parallel with one another, two thermal fuses being in parallel with one another, a capacitor being in parallel with an MOV, two capacitors being in parallel with one another, and two inductors being in parallel with one another;

(7) U.S. Pat. No. 6,038,117 to Dullni et al. which teaches pairs of MOVs being in parallel, a plurality of such pairs being in series with one another and in series with a relay;

(8) U.S. Pat. No. 5,534,769 to Ishii which teaches resistor-capacitor combinations; and (9) U.S. Pat. No. 5,808,850 to Carpenter, Jr. which teaches a three-phase device having quadruplets of parallel MOVs, each quadruplet being in series with a thermal fuse and an inductor, and bulbs for an indicator light for line to ground only.

A typical problem associated with these related art inventions is that an electrician may accidentally reverse the line wire and the neutral wire, creating an extremely hazardous situation at the wall receptacle, even if the invention succeeds in disconnecting the circuit to a peripheral device. In addition, the related art patents maintain an inordinately high component count to achieve their purpose of surge suppression. Therefore, a need exists for a circuit apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration (i.e., the minimum number of components for device size reduction) which assures a rapid simultaneous disconnect of both the hot line and the neutral line.

BRIEF SUMMARY OF THE INVENTION

An object of the present invention is to provide an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration (i.e., the minimum number of components for device size reduction) which assures a rapid simultaneous disconnect of both the hot line and neutral power lines.

Another object of the present invention is to provide an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by opening the circuit to simultaneously disconnect both the hot line and the neutral line feeding a load when the over-voltage event occurs in any of three wire pairings: line-to-neutral (L-N), line-to-ground (L-G), or neutral-to-ground (N-G).

Accordingly, the present invention provides a single-phase over-voltage protection circuit apparatus for all AC power lines and combinations thereof. In particular, the present invention provides an apparatus and a method which prevent (1) the hazardous condition occurring at the wall receptacle, arising from accidental reversal of the line wire with the neutral wire, from adversely affecting at least one peripheral device in the line, and (2) the overheating and destruction of MOVs in an over-voltage protection circuit by providing an efficient circuit configuration which assures a rapid simultaneous disconnect of both the hot line and neutral line. The present invention achieves this by opening the circuit to simultaneously disconnect both hot line and neutral line feeding a load when the over-voltage event occurs in any of the three following wire pairings: hot line to neutral line (L-N), hot line to ground line (L-G), or neutral line to-ground line (N-G).

By example, in a single phase AC power system, the hot line (L), the neutral line (N), and ground line (G) are all paths vulnerable to destructive high voltages. The present invention protects these paths by first providing protection devices in the form of metal oxide varistors (MOVs) in parallel for each pair of wires (i.e., hot line to neutral, hot line to ground, and neutral to ground). The apparatus additionally comprises in-line fuses and a normally open relay device that disconnects both the hot line as well as the neutral line from the load. The MOV devices are activated by an over-voltage condition and upon absorbing all the extra and potentially damaging power surges and over-voltages which cause excessive current to flow, which then opens the fuse, causing de-energizing of the relay device.

Accordingly, in the event of a sufficiently high voltage (i.e., $V_{L-N}$>120 V to 130 V), from hot line-to-neutral or hot line-to-ground, causing excessive heating of the MOV protection devices, the hot line and neutral line will be disconnected from the user's connected equipment. This disconnect is facilitated by the use of an open circuit condition of the in-line special fuses which causes de-energizing of the relay device and reversion of the relay contacts back to a normally open condition. Preferably, this is a non-resettable disconnect condition that maintains the relay in its normally open condition, especially where the over-voltage protection circuit is the final protection to the connected equipment for preventing excessive current and heating which, otherwise, would lead to smoke and/or fire. In the preferred embodiment, the relay simultaneously disconnects the hot line as well as the neutral line from the connected peripheral equipment (i.e., the load) such as audio and visual devices.

The current through the line may be denoted by $I_L$. The current through an MOV, $I_{MOV}$, must remain less than the rated current for the MOV, $I_{MOV-rated}$, in normal operation. During an over-voltage event where the current through the MOV exceeds its current rating (i.e., $I_{MOV}$>$I_{MOV-rated}$), thereby effecting a current through the thermal fuse exceeds its current rating ($I_L=I_{TF}$, $I_{TF}$>$I_{TF-rated}$), such thermal fuse will open, thereby preventing voltage application to the relay, thereby preventing the relay from being energized, and thereby effecting its normally-open contact state (See FIG. 1).

In all the foregoing protection modes (i.e., L-N, L-G, N-G), a warning feature may be provided which indicates that a protection device (e.g., an MOV) has absorbed an excessive energy, thereby opening a thermal fuse which effectively opens the path to any protection device and to the load. The warning feature may continue to alert the user even if power is no longer applied to the equipment. This warning feature alerts the user of the otherwise potentially destructive event. Upon so alerting the user, the apparatus should be unplugged from the wall outlet and the thermal fuse replaced. This warning feature may be audio and/or visual in nature.

Other features of the present invention are disclosed, or are apparent in the section entitled "DETAILED DESCRIPTION OF THE INVENTION."

BRIEF DESCRIPTION OF DRAWING

For a fuller understanding of the present invention, the accompanying drawing is below-referenced.

DETAILED DESCRIPTION OF THE INVENTION

Preferred Embodiment of the Apparatus

Figure 1:
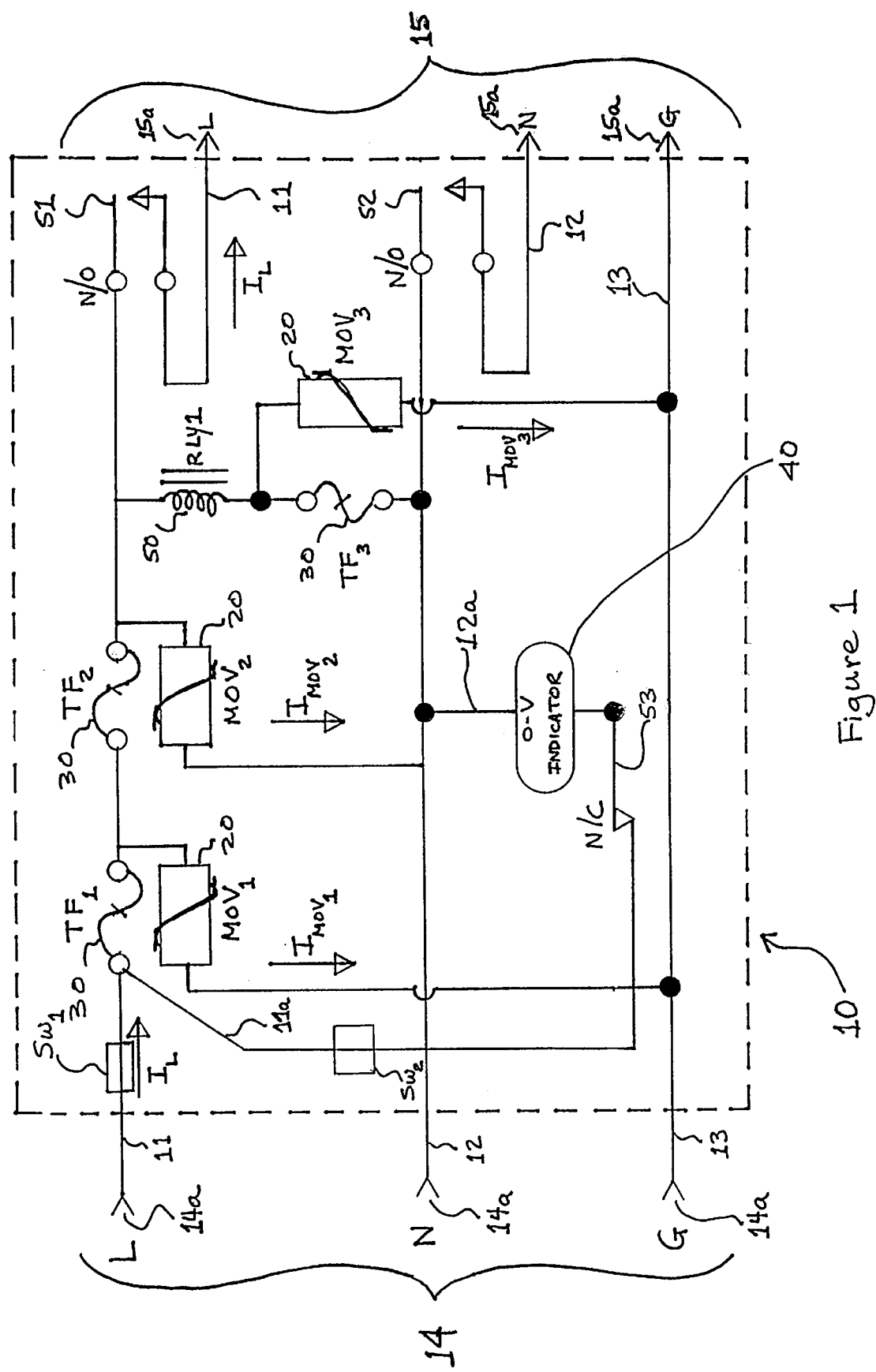
FIG. 1 is a schematic view of a tri-mode over-voltage protection and disconnect circuit apparatus, in accordance with the present invention.

FIG. 1 schematically illustrates the preferred embodiment of a single-phase tri-mode over-voltage protection and disconnect circuit apparatus 10, in accordance with the present invention. By example, the apparatus 10 comprises: an electronic circuit comprising a power input portion 14, having three power input connectors 14a that electrically couple to a hot line 11, a neutral line 12, a ground line 13 disposed internal to the over-voltage protection apparatus. By example, power input portion 14 receives AC power from a single phase power source comprising a 120 VAC line voltage measured from line-to-neutral and includes a safety ground line (not shown). Under normal operations during use of the present invention, the circuit lines 11, 12, and 13 electrically couple the AC power source to at least one peripheral device (not shown) via power output portion 15. The power output portion 15, by example, may comprise three power output connectors 15a that distribute AC power via continuation of hot line (L) 11, neutral line (N) 12, and ground line (G) 13 to a peripheral device. The three power output connectors 15a being electrically coupled with at least one peripheral device. In the preferred embodiment, three protection devices, such as metal oxide varistors (MOVs) 20 absorb any power surges and over-voltages. Each of the three MOVs 20 are disposed between three line pairings, namely hot line 11 to neutral line 12 (L-N), hot line 11 to ground line 13 (L-G), and neutral line 12 to ground line 13 (N-G). The apparatus 10 further comprises three thermal fuses (TF$_1$, TF$_2$, TF$_3$) 30. Fuses TF$_1$, TF$_2$, are disposed in series with the hot line 11, while fuse TF$_3$ being disposed in a parallel leg from the hot line 11 to neutral line 12 and being effectively disposed in series with MOV$_3$ disposed as the over-voltage protection device between the neutral line 12 and the ground line 13. The apparatus 10 further comprises a relay (Rly1) 50 disposed in the same parallel leg where fuse TF$_3$ is disposed such that the voltage between the hot line 11 and the neutral line 12 ($V_{L-N}$) energizes a relay 50 to change its contact's state from a normally-open (N/O) state to a closed contact state. Thus, thermal fuse 30 (TF$_3$) associated with the L-G line pairing, under normal operating conditions, facilitates energizing the relay 50 and distributing line voltage $V_{L-N}$ at the power output portion 15, 15a.

Continuing to refer to FIG. 1, under normal operating condition, the three MOVs 20 devices are high impedance components which facilitate voltage-energizing of the relay 50 and distribution of the line voltage to any connected peripheral equipment through relay contacts (poles) 51 and 52. The current through hot line 11 is denoted by $I_L$. The current through an MOV 20 is denoted as $I_{MOV1}$, $I_{MOV2}$, $I_{MOV3}$, respectively, and must remain less than its rated current, $I_{MOV-rated}$, under normal operation. During an over-voltage event, the particular affected MOV 20 is responsive by a lowering of its impedance such that the current through the device 20 is greater than its current rating (i.e., $I_{MOV}$>$I_{MOV-rated}$). This effectively results in a current demand through a thermal fuse 30 greater than its current rating ($I_L=I_{TF}$, $I_{TF}$>$I_{TF-rated}$). Such over-voltage condition causes an affected thermal fuse 30 to open (blow) and, thus, prevents line voltage from being applied at the relay 50, thereby preventing the relay 50 from being energized, and thereby simultaneously returning of its contacts 51, 52 to their normally-open contact state, (see FIG. 1). The opening of the fuse 30 prevents excessive heating of the affected respective one of the three MOVs 20. For safety reasons, the ground line 13 is not disconnected from the ground output G at the output connector 15a. For a neutral to ground over-voltage condition, MOV$_3$ will cause the fuse TF$_3$ to open which also causes de-energizing of the relay 50.

The apparatus 10 may further comprise a warning feature 40 (i.e., an over-voltage indicator) for indicating that at least one of the three MOVs 20 has responded to an over-voltage condition which has effected opening of at least one respective thermal fuse 30. The warning feature 40 comprises at least one warning feature selected from a group of warning features consisting essentially of an audible alarm, an indicator light, and an LED indicator, warning that AC power has been disconnected to the peripheral equipment due to an over-voltage (O-V) condition. As depicted and by example only, the warning feature 40 is energized from the input AC power source via a line 11a that remains hot, independent of fuse 30. Line 11a is connected to a normally-closed (N/C) contact 53 of the relay 50. Thus, the warning feature 40 is only active when the relay 50 is de-energized (i.e., contacts 53 are in a normally-closed state) due to an over-voltage condition. The warning feature 40 may continue alerting the user of the event, even if power is no longer applied to the peripheral device. The apparatus 10 may be disengaged from the power source after alerting by the warning feature 40, and may then be replaced. Apparatus 10 may include ON/OFF switches $Sw_1$, $Sw_2$ for power distribution, and/or for safety considerations.

EXAMPLE 1 OF THE APPARATUS

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay.

EXAMPLE 2 OF THE APPARATUS

The apparatus, as described in Example 1, may further comprise at least one warning feature for indicating that an over-voltage condition has occurred, the at least one warning feature being selected from a group of warning features consisting essentially of an audible alarm, an indicator light, and an LED indicator.

EXAMPLE 3 OF THE APPARATUS

In the apparatus, as described in Example 1, each of the over-voltage protection circuits may comprise a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

EXAMPLE 4 OF THE APPARATUS

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; and at least one warning feature for indicating that an over-voltage condition has occurred, the at least one warning feature being selected from a group of warning features consisting essentially of an audible alarm, an indicator light, and an LED indicator.

EXAMPLE 5 OF THE APPARATUS

In the apparatus, as described in Example 4, each of the over-voltage protection circuits may comprise a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

EXAMPLE 6 OF THE APPARATUS

A tri-mode over-voltage protection and disconnect circuit apparatus may comprise a first over-voltage protection circuit disposed between a hot line and a ground line; a second over-voltage protection circuit disposed between the hot line and a neutral line; a third over-voltage protection circuit disposed between the neutral line and the ground line; and a relay disposed between the hot line and the neutral line, the relay having at least two normally open sets of contacts being electrically coupled to the hot line and the neutral line, respectively, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay, wherein each the over-voltage protection circuit comprises a respective fuse; and a respective metal oxide varistor (MOV), wherein the respective fuses, associated with the first and second over-voltage protection circuits, are disposed in series with the hot line, wherein the respective fuse, associated with the third over-voltage protection circuit, is disposed in parallel between the hot line and in series with a coil member of the relay, wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

EXAMPLE 7 OF THE APPARATUS

The apparatus, as described in Example 6, may further comprise at least one warning feature for indicating that an over-voltage condition has occurred, the at least one warning feature being selected from a group of warning features consisting essentially of an audible alarm, an indicator light, and an LED indicator.

PREFERRED EMBODIMENT OF THE METHOD

The preferred method of the present invention comprises protecting a plurality of peripheral devices by providing a tri-mode over-voltage protection and disconnect circuit apparatus 10, in accordance with the present invention. By example, the method comprises the steps of providing an electronic circuit, distributing power under normal operating conditions, disconnecting power distribution to peripheral equipment responsive to an over-voltage condition occurring on any of the three electrical lines in a single phase electrical power system, namely line-to-neutral, line-to-ground and neutral-to-ground, indicating loss of power due to an over-voltage condition, and restoring power to the peripheral equipment by replacing/resetting the fuses of apparatus 10 as required. Apparatus 10 may include providing ON/OFF switches $Sw_1$, $Sw_2$ for power distribution, and/or for safety considerations.

EXAMPLE 1 OF THE METHOD

An example of the present invention method of protecting at least one peripheral device from an over-voltage condition comprises: providing a tri-mode over-voltage protection and disconnect circuit apparatus, the apparatus comprising a first over-voltage protection circuit disposed between a hot line and a ground line, a second over-voltage protection circuit disposed between the hot line and a neutral line, a third over-voltage protection circuit disposed between the neutral line and the ground line, and a relay disposed between the hot line and the neutral line, the relay having at least two normally open sets of contacts being electrically coupled to the hot line and the neutral line, respectively, the apparatus providing AC power to the at least one peripheral device, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits respond by disconnecting a voltage energizing the relay, thereby simultaneously causing the normally open state for preventing a hazardous condition at the power source, the hazardous condition arising from an accidental reversal of the hot line wire with the neutral line, and for preventing overheating and destruction of the protection circuits by providing the simultaneous disconnect of both the hot line and the neutral line by the relay; responding to an over-voltage condition, the responding step being activated by at least one of the provided over-voltage protection circuits, thereby de-energizing the relay; and further responding to the over-voltage condition by disconnecting a voltage energizing the relay, thereby simultaneously causing the normally open state.

EXAMPLE 2 OF THE METHOD

The method, as described in Example 1, may further comprise providing at least one warning feature for indicating that an over-voltage condition has occurred, the at least one warning feature being selected from a group of warning features consisting essentially of an audible alarm, an indicator light, and an LED indicator; and warning that an over-voltage condition has occurred by activating the provided warning feature.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, semiconductor material, and fabrication material detail may be made without departing from the spirit and scope of the inventions as set forth in the appended claims. No claim herein is to be construed under the provisions of 35 U.S.C. 112, sixth paragraph, unless the element is expressly recited using the phrase "means for."

What is claimed:

1. A tri-mode over-voltage protection and disconnect circuit apparatus comprising:
   a. a first over-voltage protection circuit disposed between a hot line and a ground line;
   b. a second over-voltage protection circuit disposed between the hot line and a neutral line;
   c. a third over-voltage protection circuit disposed between the neutral line and the ground line;
   d. a relay disposed between the hot line and the neutral line, the relay having at least two normally open sets of contacts being electrically coupled to the hot line and the neutral line, respectively,
   wherein each of the over-voltage protection circuits comprises:
      a respective metal oxide varistor (MOV) and a fuse,
   wherein the respective fuses, associated with the first and second over-voltage protection circuits, are disposed in series with the hot line,
   wherein the respective MOV, associated with the first over-voltage protection circuit, is disposed in parallel with the hot line and the ground line,
   wherein the respective MOV, associated with the second over-voltage protection circuit, is disposed in parallel with the hot line and the neutral line, and
   whereby the respective MOV, associated with the third over-voltage protection circuit, being disposed in a manner facilitating response to an over-voltage condition occurring between the neutral line and the ground line,
   wherein the respective fuse associated with the third over-voltage protection circuit is disposed in parallel between the hot line and the neutral line and in series with a coil member of the relay,
   whereby the hot line and the neutral line are not distributed as an output voltage when the sets of contacts are in a normally open state when the relay is de-energized,
   whereby the hot line and the neutral line are distributed as an output voltage when the sets of contacts are in a closed state when the relay is energized,
   whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage; and
   e. warning means for indicating that an over-voltage condition has occurred, the warning means being selected from a group consisting of
      (1) an incandescent light,
      (2) an LED indicator, and
      (3) an audible-sound-producing device,
   wherein the warning means is activated when at least one over-voltage protection circuit has responded to an over-voltage and de-energized the relay.

2. A tri-mode over-voltage protection and disconnect circuit apparatus comprising:
   a. a first over-voltage protection circuit disposed between a hot line and a ground line;
   b. a second over-voltage protection circuit disposed between the hot line and a neutral line;
   c. a third over-voltage protection circuit disposed between the neutral line and the ground line,
   wherein each of the over-voltage protection circuits comprises;
      a) a respective fuse and
      b) a respective metal oxide varistor (MOV),
   wherein the respective fuses associated with the first and second over-voltage protection circuits are disposed in series with the hot line,
   wherein the respective MOV associated with the first over-voltage protection circuit is disposed in parallel with the hot line and the ground line,
   wherein the respective MOV associated with the second over-voltage protection circuit is disposed in parallel with the hot line and the neutral line, and
   whereby the respective MOV associated with the third over-voltage protection circuit, being disposed in a manner facilitating response to an over-voltage condition occurring between the neutral line and the ground line;
   d. a relay disposed between the hot line and the neutral line,
      the relay having at least two normally open sets of contacts being electrically coupled to the hot line and the neutral line, respectively,
   wherein the respective fuse associated with the third over-voltage protection circuit is disposed in parallel between the hot line and the neutral line and in series with a coil member of the relay,
   whereby the hot line and the neutral line are not distributed as an output voltage when the sets of contacts are in a normally open state when the relay is de-energized,
   whereby the hot line and the neutral line are distributed as an output voltage when the sets of contacts are in a closed state when the relay is energized,
   whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage; and
   e. a warning feature for indicating that an over-voltage condition has occurred, the warning feature being selected from a group consisting of
      (1) an incandescent light and
      (2) an LED indicator,
   wherein the warning feature is normally not-lighted under normal power conditions and lighted whenever one or more of the over-voltage protection circuits has responded to an over-voltage condition and de-energized the relay.

3. A method of protecting at least one peripheral device from an over-voltage condition, the method comprising:
   A. providing a tri-mode over-voltage protection and disconnect circuit apparatus, the apparatus comprising;
      a. a first over-voltage protection circuit disposed between a hot line and a ground line,
      b. a second over-voltage protection circuit disposed between the hot line and a neutral line,
      c. a third over-voltage protection circuit disposed between the neutral line and the ground line,
      d. a relay disposed between the hot line and the neutral line, the relay having at least two normally open sets of contacts being electrically coupled to the hot line and the neutral line, respectively, the apparatus providing AC power to the at least one peripheral device, wherein each of the over-voltage protection circuits comprises a respective fuse, wherein the respective fuses associated with the first and second over-voltage protection circuits are disposed in series with the hot line, wherein the respective fuse, associated with the third over-voltage protection circuit, is disposed in parallel between the hot line and the neutral line and in series with a coil member of the relay, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage;

B. responding to an over-voltage condition, the responding step being activated by at least one of the provided over-voltage protection circuits, thereby de-energizing the relay;

C. further responding to the over-voltage condition by disconnecting a voltage energizing the relay, thereby simultaneously causing the normally open state;

D. providing at least one warning feature for indicating that an over-voltage condition has occurred, the at least one warning feature being selected from a group of warning features consisting essentially of:
  (1) An audible alarm,
  (2) an indicator light and
  (3) an LED indicator; and E. warning that an over-voltage condition has occurred by activating the provided warning feature.

4. A tri-mode over-voltage protection and disconnect circuit apparatus, comprising:

a. a first over-voltage protection circuit disposed between a hot line and a ground line;

b. a second over-voltage protection circuit disposed between the hot line and a neutral line;

c. a third over-voltage protection circuit disposed between the neutral line and the ground line; and d. a relay disposed between the hot line and the neutral line, the relay having at least two normally open sets of contacts being electrically coupled to the hot line and the neutral line, respectively, wherein each of the over-voltage protection circuits comprises a respective fuse, wherein the respective fuses associated with the first and second over-voltage protection circuits are disposed in series with the hot line, wherein the respective fuse, associated with the third over-voltage protection circuit, is disposed in parallel between the hot line and the neutral line and in series with a coil member of the relay, whereby the hot line and the neutral line are not distributed as an output voltage when the sets of contacts are in a normally open state when the relay is de-energized, whereby the hot line and the neutral line are distributed as an output voltage when the sets of contacts are in a closed state when the relay is energized, and whereby, in the event of an over-voltage condition, at least one of the first, second, and third over-voltage protection circuits responds by disconnecting a voltage energizing the relay, thereby simultaneously causing the normally open state such that the hot line and the neutral line are not distributed as an output voltage.

5. The apparatus, as recited in claim 4, further comprising:

e. at least one warning feature for indicating that an over-voltage condition has occurred, the at least one warning feature being selected from a group of warning features consisting essentially of;
  (1) an audible alarm,
  (2) an indicator light, and
  (3) an LED indicator.

6. The apparatus, as recited in claim 4, wherein each of the over-voltage protection circuits comprises:

a respective metal oxide varistor (MOV), wherein the respective MOV, associated with the first over-voltage protection circuit, is disposed in parallel with the hot line and the ground line, wherein the respective MOV, associated with the second over-voltage protection circuit, is disposed in parallel with the hot line and the neutral line, and whereby the respective MOV, associated with the third over-voltage protection circuit, being disposed in a manner facilitating response to an over-voltage condition occurring between the neutral line and the ground line.

* * * * *